United States Patent [19]

Nurnberg

[11] 4,078,720

[45] Mar. 14, 1978

[54] TIME VARIABLE THERMOSTAT

[75] Inventor: Richard K. Nurnberg, Norristown, Pa.

[73] Assignee: Robertshaw Controls Company, Richmond, Va.

[21] Appl. No.: 706,667

[22] Filed: Jul. 19, 1976

[51] Int. Cl.² ............... F23N 5/20; G05D 23/00
[52] U.S. Cl. .................................. 236/46 R; 165/12; 361/161
[58] Field of Search ............ 236/46 R, 46 E, 47; 165/12; 62/231; 337/301, 302, 303; 219/493; 307/141.4; 361/161, 194

[56] References Cited

U.S. PATENT DOCUMENTS

| 3,599,863 | 8/1971 | Pinckaers | 236/46 R |
| 3,620,448 | 11/1971 | Nelson | 236/46 R |
| 3,948,441 | 4/1976 | Perkins et al. | 236/46 R |

OTHER PUBLICATIONS

U.S. Patent Application #694,272, Knecht et al., commonly assigned to Robertshaw Inc.

*Primary Examiner*—William E. Wayner
*Attorney, Agent, or Firm*—Auzville Jackson, Jr.; Harold W. Adams

[57] ABSTRACT

The invention is a time variable set point thermostatic device adapted for use in a two-wire circuit of a heating or cooling system without additional wiring. Electric timer means interconnected with a thermostatic switch and starting relay means of a transformer having a primary and secondary winding periodically changes the set point of the thermostatic switch at selected intervals. The circuit is arranged to limit the current in the two-wire control circuit to a value less than that required to actuate the starting relay of the heating or cooling system in the two-wire control circuit with the thermostatic switch open and to actuate the starting relay when the thermostatic switch is closed when the ambient temperature to be regulated varies a determined amount from a selected temperature set point and the thermostatic switch is closed.

7 Claims, 1 Drawing Figure

TIME VARIABLE THERMOSTAT

BACKGROUND OF THE INVENTION

Electrical thermostats including means for changing the ambient temperature setting or set point of the thermostat at selective times are broadly known. Typically, in a heating system, for instance, such thermostats are employed to set the temperature setting of the thermostat back at night and then the following morning restore it to the previous day setting as an energy saving measure. Such action is applicable in cooling systems as well and in general is taken during the time of maximum change of activity in the rooms in which the temperature is regulated. Typically, such thermostats are installed in a low voltage, two-wire control circuit of the heater, furnace or air conditioner as the case may be.

For instance, in co-pending U.S. patent application, Ser. No. 497,151, filed Aug. 13, 1974, now U.S. Pat. No. 3,948,441 which issued Apr. 6, 1976, and entitled Time Variable Thermostat in which I am a co-inventor, both the co-pending and this application being assigned to the same Assignee, there is disclosed a unitary, battery-powered thermostatic device adapted for use in a conventional two-wire control circuit without additional wiring. While the time variable thermostat described in the aforesaid copending application offers many advantages, it may be desirable from an economic standpoint to eliminate the initial and/or the replacement cost of the battery for such systems.

SUMMARY OF THE INVENTION

The invention is summarized in that a transformer is employed in a low voltage, alternating current two-wire control circuit to interconnect a starting relay of a heating unit, a thermostatic control means, and electric timer means for changing the set point of the thermostatic control means at selected times, the resulting circuit being arranged so that the electric timer means is continuously operated and the starting relay energized only when the thermostatic switch is closed.

Although the invention has been summarized as being used in a two-wire heating control system, it is understood it can be employed in a cooling system as well.

BRIEF DESCRIPTION OF THE INVENTION

Figure 1:
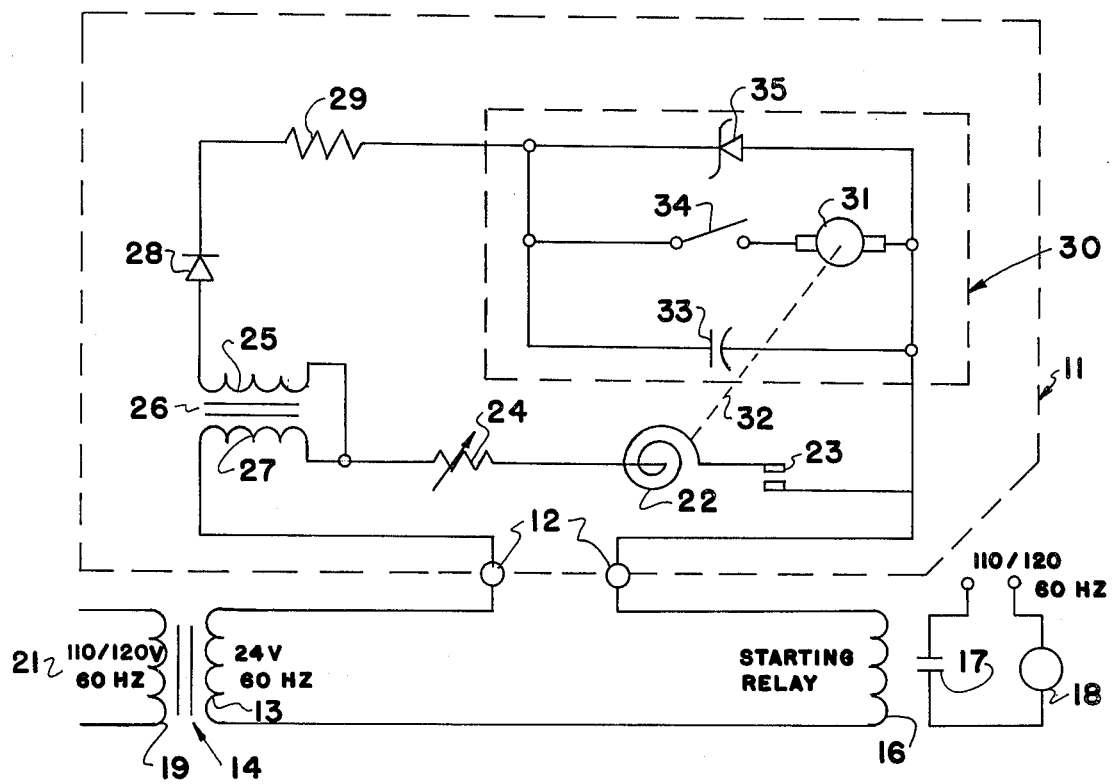
FIG. 1 is an electrical schematic of a preferred embodiment of the invention for use in the low voltage control circuit of a heating and/or cooling unit including a motor driven fan or blower.

Referring to the drawing, FIG. 1 illustrates an electrical schematic of a preferred embodiment of the invention (shown in the dashed line enclosure and designated by reference numeral 11) directly connected into a typical two-wire, low voltage alternating current furnace or heater control circuit at terminals 12. The two-wire control circuit includes a secondary winding 13 of a line voltage step down transformer designated by the reference numeral 14 and a heating unit control solenoid or starting relay 16 that closes switch contacts 17 to turn the furnace 18 "on" or "off" as called for by the remotely mounted thermostatic device 11. Switch 17 could also represent a heat motor or gas operated valve. The primary winding 19 of the step down transformer 14 is connected to a 110/220V alternating current voltage supply 21.

A preferred embodiment of a time variable thermostatic device 11 in accordance with the invention as shown within the dotted outline includes a conventional bi-metal ambient temperature responsive thermostat 22 that opens and closes switch 23 in response to variations in ambient temperature from at least two mechanically selectable set points.

A commercially available thermostat that includes mechanical means for selectively varying the temperature set point of a bi-metal actuated switch is the Model TH200 thermostat manufactured by the Grayson Division, Robertshaw Controls Company, 100 West Victoria Street, Long Beach, California. As is well known, the thermostat may also include a variable resistance 24 that serves to provide additional current to heat the bi-metal 22 to open contacts 23 before the ambient temperature reaches the set point and to avoid overshooting and thus overheating.

Thermostat 22, switch 23 and resistor 24 are series connected to form a first branch of a parallel circuit. The second branch of this parallel circuit includes secondary winding 25 of transformer 26, diode 28, limit resistor 29 and an electrical timer 30 shown in dotted lines. Primary winding 27 of transformer 25 is series connected with the aforementioned parallel circuit and starting relay 16 in the two-wire low voltage control circuit.

The electrical timer 30 includes a conventional twenty-four hour clock mechanism driven by an electric motor 31. As is known, the timer may operate with either a mechanical type escapement or a crystal controlled timing means. The timer 30 is arranged to drive a cam or other suitable linkage 32 to mechanically vary the temperature set point of thermostat 22 at selected times determined by the clock mechanism of the timer 30. Operation may be arranged for a 12, 24 or other hourly cycle during which the electric motor 31 is periodically energized for short periods and deenergized for long periods.

Commercially available electrical motor driven timers of the type described which have proven satisfactory in operation are the Model 532AN motor driven clock mechanism manufactured by JECO of Japan and the General Time Model 73200 manufactured by General Time, Inc., Main & Meadow Streets, Thomaston, Connecticut 06787. In actual tests, the JECO timer was found to require a peak current of 160 MA and an average current of 60 MA during an on period of 1.5 seconds with an off period of 6 minutes. The General Time unit was found to require a current of 5 MA for a 50 millisecond on period and an off period of 300 milliseconds.

Capacitor 33 stores the continuous DC output of rectifier 28 in order to supply the additional current required by motor 31 as called for by the clock mechanism. Switch 34 connected between capacitor 33 and motor 31 is provided as a start switch permitting the capacitor to first be charged when switch 34 is opened momentarily following a failure of line supply voltage. Switch 34 is then closed permitting the capacitor 33 to discharge starting the motor 31 and timing mechanism 30. In the event a self starting timer motor is employed, such as the General Time unit, switch 34 is not required. Zener diode 35 connected in parallel with capacitor 33 limits the peak capacitor voltage permitting use of the electrical timer 30 with wide variations of starting relay current in the two-wire control circuit.

Transformer 26 has a relatively high secondary to primary turn ratio (for instance 16:1) and is arranged to saturate with a small current through primary winding 27 (for instance 50 MA). Because of this low saturation level, a wide range of solenoid current results in no appreciable increase in voltage drop across the primary. This permits the invention to be used in conventional two-wire control circuits without calibration even over wide ranges of starting relay current, an important feature when the invention is to be used in existing furnace control circuits.

In operation with thermostat 22 satisfied and contacts 23 open, a small current is drawn through the starting relay 16, secondary winding 25 and rectified by diode 28 to charge capacitor 33 to a determined DC level. Resistor 29 limits this trickle current to a value low enough that starting relay 16 remains de-energized. Periodically, as determined by the clock mechanism of electrical timer 30, capacitor 33 discharges to provide that additional current required to energize the timer motor 31 for short intervals. The size of capacitor 33 is determined by the current requirements of the motor.

When the ambient temperature falls below any given set point of the thermostat 22, as determined by the timer 30, switch 23 closes energizing starting relay 16 which in turn closes its contacts 17 to operate heating unit 18. As mentioned, since the transformer 26 is saturated by a very small primary winding current, the voltage drop across primary winding 27 remains substantially constant providing a sufficient range of primary currents to energize a wide selection of conventional starting relays and solenoids as determined by the respective resistance of each device. This operation permits the invention to be directly installed in nearly all conventional two-wire, low voltage control circuits without additional wiring or calibration.

With switch 23 closed, the voltage induced in secondary winding is rectified and capacitor 33 charged in the same manner as when switch 23 is open. During this period, Zener diode 35 serves to limit the peak voltage on capacitor 33 so the circuit may be used with wide variations in starting relay current.

As is well known, the timing mechanism 30 can be arranged to change the temperature set point of the thermostat 22 from a first to a second value at selected intervals. For instance, on a twenty-four hour cycle at 6:00AM and 8:00PM when the invention is installed in the two-wire low voltage control circuit of a residential heating system. Thereafter the heating unit is controlled automatically except in the event of a line voltage power failure at which time it would be necessary to reset the clock mechanism of the timing device.

Thus, it is seen that the invention provides a unique and novel circuit in which a transformer is employed in a two-wire control circuit to interconnect a starting relay of a heating unit, a thermostatic control means and electric timer means for changing the set point of the thermostatic control means at selected times to selected values, the circuit being arranged so the electric timer means is continuously operated and the starting relay energized only when the thermostatic means calls for heat and a switch therein is closed.

Although a preferred embodiment of the invention has been described in detail numerous changes can be made within the principles of the invention which is to be limited only by the scope of the appended claims.

What is claimed is:

1. In a unitary, time variable thermostatic device adapted for connection without additional wiring into a two-wire control circuit that includes a starting relay for operating a heating and/or cooling unit when actuated the improvement comprising:
    thermostatic control means including a thermostatic switch responsive to ambient temperatures and having at least two temperature set points;
    electrical timer means for changing the temperature set point of said thermostatic control to and from said respective values at selected times; and
    circuit means including a transformer having inductively coupled primary and secondary windings having a high secondary to primary turn ratio arranged to saturate with a small current through said primary winding thereby maintaining a substantially constant voltage drop across said primary winding over a wide range of primary winding current, said primary and secondary directly interconnecting said starting relay, said thermostatic control means and said electrical timer means in said two-wire control circuit whereby said starting relay is actuated only when said thermostatic switch of said thermostatic control means is closed.

2. The improvement as defined in claim 1 wherein said circuit means includes rectifier means connected to said electrical timing means across said secondary winding for supplying a direct current voltage to said electrical timing means in either position of said thermostatic switch.

3. The improvement as defined in claim 2 wherein said electrical timing means comprises energy storage means connected to and charged by said rectifier means;
    a clock mechanism; and
    an electrical motor periodically driving said clock mechanism when energized, said clock mechanism periodically controlling the discharge of said energy storage means to energize said motor and drive said clock mechanism.

4. The improvement as defined in claim 3 including resistor means connected to said rectifier means for limiting current in said starting relay preventing its operation when said thermostatic switch is open.

5. The improvement as defined in claim 4 wherein said electrical timer means includes means for limiting the peak voltage on said capacitor storage means.

6. An electrical time variable set point thermostatic device as defined in claim 2 including a manually operable starting switch connected between said energy storage means and said timer means, said starting switch permitting said energy storage means to be recharged when momentarily opened following a power failure in said two-wire control circuit.

7. An electrical time variable set point thermostatic device adapted for connection and use in a two-wire, low voltage, alternating current control circuit of a heating or cooling system without additional wiring comprising:
    thermostatic control means including a thermostatic switch and having at least two temperature set points responsive to the ambient temperature in a space the temperature of which is to be regulated, said thermostatic switch being connected in said control circuit and arranged to actuate starting relay means connected in said control circuit to operate said heating or cooling system when said ambient temperature varies a determined amount from a selected one of said temperature set points and said thermostatic switch is closed;

timer means including an electric motor operatively connected to said thermostatic control means for periodically changing said temperature set point of said thermostatic control means from an initial value at a selected time to a second value and at a selected time thereafter restoring said temperature set point to said initial value, said electric motor being periodically energized for short periods to drive said timer means; and transformer means including inductively coupled primary and secondary windings having a high secondary to primary turn ratio arranged to saturate with a small current through said primary winding thereby maintaining a substantially constant voltage drop across said primary winding over a wide range of primary winding current, said primary and secondary directly interconnecting said thermostatic control means, said electric timer means and said starting relay means for energizing said two-wire control circuit and actuating said starting relay means when said thermostatic switch is closed.

* * * * *